(12) United States Patent
Reschka et al.

(10) Patent No.: US 11,809,190 B2
(45) Date of Patent: Nov. 7, 2023

(54) METHODS AND SYSTEMS TO ASSESS VEHICLE CAPABILITIES

(71) Applicant: Zoox, Inc., Foster City, CA (US)

(72) Inventors: Andreas Christian Reschka, Foster City, CA (US); Thomas Bernard Gacka, Redwood City, CA (US); Collin MacGregor, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 199 days.

(21) Appl. No.: 17/246,048

(22) Filed: Apr. 30, 2021

(65) Prior Publication Data

US 2022/0350335 A1   Nov. 3, 2022

(51) Int. Cl.
| | | |
|---|---|---|
| G05D 1/02 | (2020.01) | |
| G05D 1/00 | (2006.01) | |
| B60W 60/00 | (2020.01) | |
| B60W 50/02 | (2012.01) | |

(Continued)

(52) U.S. Cl.
CPC ....... *G05D 1/0214* (2013.01); *B60W 50/0205* (2013.01); *B60W 60/0015* (2020.02); *G01C 21/3415* (2013.01); *G05D 1/0055* (2013.01); *G05D 1/0088* (2013.01); *G06N 7/01* (2023.01); *B60W 2554/00* (2020.02); *B60W 2720/10* (2013.01); *B60W 2720/106* (2013.01); *B60W 2720/12* (2013.01); *B60W 2720/125* (2013.01);

(Continued)

(58) Field of Classification Search
CPC .. G05D 1/0214; G05D 1/0055; G05D 1/0088; G05D 2201/0213; B60W 50/0205; B60W 60/0015; B60W 2554/00; B60W 2720/10; B60W 2720/106; B60W 2720/12; B60W 2720/125; B60W 2754/20; B60W 2754/30; G01C 21/3415; G06N 7/01; G06N 3/02; G06N 5/04
See application file for complete search history.

(56) References Cited

U.S. PATENT DOCUMENTS

| | | | |
|---|---|---|---|
| 2020/0223453 A1* | 7/2020 | Le Chaffotec | .... B60W 60/0057 |
| 2021/0012648 A1 | 1/2021 | Körner | |
| 2021/0046943 A1 | 2/2021 | Bybee | |

(Continued)

FOREIGN PATENT DOCUMENTS

| | | |
|---|---|---|
| EP | 3511740 A1 | 7/2019 |
| KR | 20200094641 A1 | 8/2020 |
| WO | WO2019220319 A1 | 11/2019 |

OTHER PUBLICATIONS

Lima, A Bayesian Approach to Sensor Fusion in Autonomous Sensor and Robot Networks, IEEE, Jun. 2007 (Year: 2007).*

(Continued)

*Primary Examiner* — Anne Marie Antonucci
*Assistant Examiner* — Patrick Daniel Mohl
(74) *Attorney, Agent, or Firm* — Lee & Hayes, P.C.

(57) ABSTRACT

Performance anomalies in autonomous vehicle can be difficult to identify, and the impact of such anomalies on systems within the autonomous vehicle may be difficult to understand. In examples, systems of the autonomous vehicle are modeled as nodes in a probabilistic graphical network. Probabilities of data generated at each of the nodes is determined. The probabilities are used to determine capabilities associated with higher level functions of the autonomous vehicle.

20 Claims, 5 Drawing Sheets

(51) Int. Cl.
*G01C 21/34* (2006.01)
*G06N 7/01* (2023.01)

(52) U.S. Cl.
CPC ..... *B60W 2754/20* (2020.02); *B60W 2754/30* (2020.02); *G05D 2201/0213* (2013.01)

(56) References Cited

U.S. PATENT DOCUMENTS

2021/0197854 A1\* 7/2021 Grabe .................. G08G 1/20
2022/0121210 A1\* 4/2022 Herman ............... G06F 16/245

OTHER PUBLICATIONS

Smith, A Bayesian Framework for the Automated Online Assessment of Sensor Data Quality, Sensors, 2012 (Year: 2012).\*
The PCT Search Report and Written Opinion dated Aug. 10, 2022 for PCT Application No. PCT/US22/26989, 13 pages.

\* cited by examiner

METHODS AND SYSTEMS TO ASSESS VEHICLE CAPABILITIES

BACKGROUND

Autonomous vehicles include many computing systems receiving, generating and outputting different data. For example, the computing systems may include sensor systems that generate information about an environment in which the autonomous vehicle is travelling, perception systems that generate information about objects in the environment from the sensor data, and control systems that control aspects of the autonomous vehicle to perform various operations. Each of these systems includes its own processing and functionality, and data generated by each system includes some degree of estimation. Because of the potential consequences associated with unsafe operation, autonomous vehicles may enter a safe state upon detecting any anomaly at any of the vehicle systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
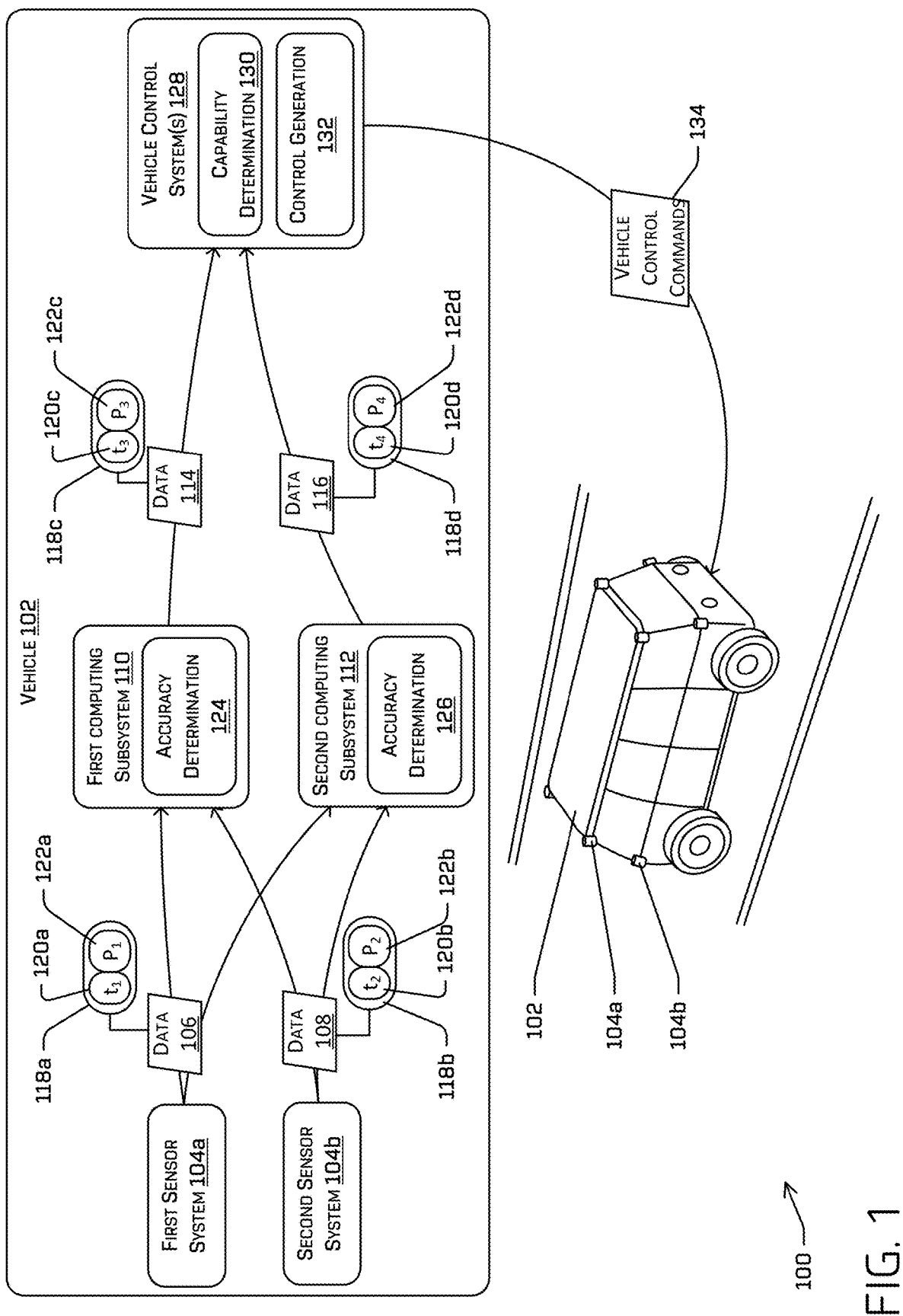
FIG. 1 illustrates an example vehicle, such as an autonomous vehicle, and example components for assessing capabilities of the vehicle, according to aspects of this disclosure.

This disclosure describes methods, apparatuses, and systems for determining capabilities of an autonomous vehicle, and controlling the vehicle according to such capabilities. In illustrative examples described herein, the capabilities may be based, for example, on a probability that an autonomous vehicle is capable of performing one or more tasks, based on probability data associated with data used to perform the task. For example, an autonomous vehicle may include a number of computing systems, each requiring different data inputs, generating different data outputs, and generally necessary for proper and safe operation of the vehicle. Because of the interconnectedness of the system(s) as well as the volume of functions being performed and data being generated, it is desirable to consider all functions when determining vehicle capabilities.

In some cases, the autonomous vehicle may be modelled as a probabilistic graphical model. For example, each sensor and computing system may be represented as a discrete node in the in the model, with edges connecting the nodes based at least in part on a dependency of the systems to other of the systems. For instance, sensors generating data based on observations of the environment of the vehicle may be the lowest level nodes. Relatively higher-level nodes connected to the nodes representing the sensors represent systems that receive and process data from the sensors. In some examples, the systems of the autonomous vehicle may be modelled as nodes in a Bayesian network.

Aspects of this disclosure relate to determining uncertainty data associated with each instance of generated data. For example, the uncertainty may be calculated as a confidence or probability associated with each instance of data generated at a sensor. When the sensor data is subsequently used at a computing system, an uncertainty is determined for each instance of the data generated by the computing system. In examples, the uncertainty associated with the data generated by the computing system is based on the uncertainties of the data used by the computing system, as well as an error associated with the computing system. In this way, uncertainties for data generated by higher-level functions are based on uncertainties associated with the lower-level data upon which the higher-level functions rely.

As a result of the probabilistic representation of the autonomous vehicle, probabilities associated with data, e.g., uncertainties associated with the data estimates, are propagated through the system from the lower level functions to the higher-level functions. In some examples, capabilities of the vehicle to perform certain tasks, e.g., mission critical tasks, are determined based on the propagated uncertainties. The capabilities may also be based on additional data. For instance, time data may be associated with each instance of data generated at each system. The time data may be used to determine a frequency at which data is generated by each system, e.g., to additionally access functionality of systems of the autonomous vehicle.

Examples of this disclosure provide improvements over conventional systems. For example, some conventional systems consider data certainty only on a system-by-system basis. Instead, the techniques described herein allow for a holistic approach to determining vehicle capabilities. Such an approach may result in allowing for continued, e.g., normal, operation of the vehicle, even if some data is anomalous. Similarly, the techniques described herein can determine unsafe operating conditions, even if all data is within normal tolerances. Without limitation, some conventional systems perform a binary decision to operate the vehicle or execute a safe stop when data generated by a system is unreliable or anomalous. Modelling the systems as nodes in a probabilistic network, e.g., a Bayesian network, allows for a better assessment of health of the systems of the autonomous vehicle. The assessment may further benefit from conventional models, e.g., system-level uncertainty models used previously to make the binary decisions just discussed. In examples described herein, such conventional models may be used as a datapoint in determining overall system confidence.

Examples of this disclosure also describe techniques for controlling the autonomous vehicle based on the health assessment. For example, the uncertainty information determined according to aspects can be used to determine a vehicle capability metric. In examples, techniques described herein can determine a vehicle capability metric on a task-by-task basis, e.g., for tasks that are critical to safe operation of the vehicle, e.g., changing lanes, following a vehicle, operating in a lane, following a speed limit, or the like. In some examples, when the vehicle capability metric associated with a certain task is equal to or above a first threshold metric, the vehicle may perform the task as intended. For example, the health of the vehicle is good, and the task can be performed according to normal functioning. Alternatively, when the vehicle capability metric is below the first threshold metric, aspects of the task may be modified. For instance, if the vehicle capability metric is higher than a second threshold metric (which is lower than the first threshold metric), implementation of the task may be modified, to effectuate a more careful vehicle operation. Without limitation, such modifications can include increasing a minimum distance between the vehicle and objects in the environment, reducing a maximum speed of the vehicle, or the like. For example, such modifications may allow for increased processing and/or computing time at the vehicle, e.g., to safely perform maneuvers even with data having lower associated confidence metrics.

While this disclosure uses an autonomous vehicle in examples, techniques described herein are not limited to application in autonomous vehicles. In some instances, techniques described herein can be used to determine and/or characterize performance parameters, e.g., latency and/or resource usage for any of a number of complex systems. Moreover, techniques descried herein may be used to identify and/or mitigate anomalous functioning, e.g., events, in such complex systems. In some examples, any complex system that includes interrelated systems that perform functions and/or pass messages may benefit from the techniques described. By way of non-limiting example, techniques described herein may be used on airborne and/or ground-borne vehicles, as well as other fully- or partly-autonomous robotic systems. Moreover, non-autonomous vehicles could also benefit from techniques described herein, e.g., for safety in the absence of viable data.

FIGS. 1-5 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is an example, and the systems and methods described herein may be incorporated into any systems having complex subsystem and/or inter-system communications. As non-limiting examples, such systems may comprise ground-borne, airborne, or waterborne vehicle, including those ranging from vehicles that need to be manually controlled by a driver at all times, to those that are partially or fully autonomously controlled. In some instances, the techniques can be implemented in any system that includes one or more computing systems performing functions. As will be appreciated from the description herein, this disclosure is not limited to vehicles.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions, for example, such that a first end of the vehicle 102 is the front end of the vehicle 102 when traveling in a first direction, and such that the first end becomes the rear end of the vehicle 102 when traveling in the opposite direction. Similarly, a second end of the vehicle 102 is the front end of the vehicle when traveling in the second direction, and such that the second end becomes the rear end of the vehicle 102 when traveling in the opposite direction. These example characteristics may facilitate greater maneuverability, for example, in small spaces or crowded environments, such as parking lots and/or urban areas.

The vehicle 102 may travel through the environment 100 and collect data. For example, the vehicle 102 can include one or more sensor systems, including a first sensor system 104*a* and a second sensor system 104*b* (herein referred to collectively and/or with other, unlabeled sensor systems, the sensor systems 104). The sensor systems 104 can include, for example, LIDAR sensors, RADAR sensors, SONAR sensors, time-of-flight sensors, image sensors, audio sensors, infrared sensors, location sensors, etc., or any combination thereof. The sensor systems 104 may be disposed to capture, e.g., generate, sensor data associated with the environment 100. In the illustrated example, the first sensor system 104*a* may generate first sensor data 106 and the second sensor system 104*b* may generate second sensor data 108. For example, the first sensor system 104*a* can include a LiDAR sensor, in which case the first sensor data 106 may include a point cloud, and the second sensor system 104*b* can include a camera, in which case the second sensor data 108 may include image data. These examples are for illustration only, as the sensor systems 104 may include any number, type, and/or modality of sensor system(s).

The vehicle 102 can also include one or more computing systems and/or subsystems. For example, FIG. 1 illustrates a first computing subsystem 110 and a second computing subsystem 112 (collectively referred to herein, and including additional computing systems not shown, as the computing subsystem(s) 110, 112). Although these two example systems are illustrated, the vehicle 102 may include more, fewer, and/or other systems. Though depicted in FIG. 1 as separate systems for illustrative purposes, such computing systems may comprise virtual machines, processes, or the like running on one, two, three, or more computing systems. An example computing system of the computing subsystems 110, 112, can include one or more of a localization system, a perception system, a planning system, a system controller, an emitter, a mapping system, a state determination system, or the like. Some of these and other example systems (which may be components and/or subsystems) are detailed further herein, including with reference to FIGS. 2 and 3. In other examples, the computing subsystem(s) 110, 112 can also or alternatively include a system communicating with the vehicle 102, e.g., via a wired or wireless connection. The computing subsystem(s) 110, 112 may be configured to perform one or more processes e.g., by executing one or more functions, and may use data to perform those functions. For instance, as illustrated in FIG. 1, the first computing subsystem 110 may be configured to receive the first sensor data 106 and the second sensor data 108 and generate an output comprising data 116. Similarly, the second computing system 112 may be configured to receive the second sensor data 108 and generate an output comprising data 118.

The sensor systems 104, the first computing subsystem 110, and the second computing subsystem 112 (as well as any additional or alternative sensor system, computing systems, and/or computing subsystem) generate the respective data 106, 108, 114, 116 using functionality, algorithms, processing techniques, and/or the like. The data 106, 108, 114, 116 has some inherent error. For instance, in an example in which the first sensor system 104a is a LiDAR sensor, the data 106 may be a point cloud including depths of points. Those depths are estimates, with some associated error or uncertainty. For instance, the depth associated with each point in the data 106 may accurate to within 0.5 mm, 5 mm, or the like. In another example, the first computing subsystem 110 may be a perception system configured to identify and determine the extents of an object in the environment 100. For example, the data 114 may be data associated with eight points for an object, the points corresponding to corners of a bounding box representative of the object. For instance, the first computing subsystem 110 may implement a trained neural network that outputs the eight points, as well as a confidence value associated with each of the points. The confidence value(s) may be based on aspects of the neural network. Conventionally, the confidence values do not consider the accuracy of the data input into the neural network, e.g., the error associated with the data 106 and/or the data 108 in the example of FIG. 1, only the certainty of the model.

Aspects of this disclosure generate probabilities for each data type and for each instance of the data type. More specifically, FIG. 1 illustrates that additional information can be associated with the various types of data associated with the vehicle 102. For example, data in the system can be tagged upon receipt, generation, and/or transmission with timestamp information and probability information. As shown in FIG. 1, an instance of the data 106 generated by the first sensor system 104a may have associated first information 118a that includes first timestamp information ($t_1$) 120a and first probability data ($P_1$) 122a. The first timestamp information 120a may include a time at which the data 106 was captured, e.g., a time at which a sensor of the first sensor system 104a was read out, and/or a time at which the data was sent, e.g., transmitted or published, by the first sensor system 104a. The first probability data 122a may be information associated with a certainty of the data 106. For instance, the first probability data 122a may be a probability that a measured value in the data 106 is actually the measured value and/or a probability that the measured value in the data 106 is actually a different value(s), e.g., value(s) within a margin of error of the sensor system. The first probability data 122a associated with the data 106 may be based on functioning and/or malfunctioning of the first sensor system 104a. Thus, for example, the data 106 may be generated periodically by the first sensor system 104a and each instance of the data 106 may have an associated probability. The first probability data 122a may be a probability distribution. As described further throughout this disclosure, systems and subsystems of the autonomous vehicle 102 may be modelled using a probabilistic graphical model, and the first probability data 122a may be a probability determined using that model. In at least some examples, as the data 106 propagates through the autonomous vehicle 102, the additional information 118a is used to determine capabilities of the autonomous vehicle 102 and/or a likelihood that the autonomous vehicle 102 is capable of performing certain functions, including critical autonomous driving functions. The additional information 118a may be a tag associated with the data 106, e.g., generated and appended to each instance of the data 106 by the first sensor system 104a. In some instances, the first sensor system 104a can output the data 106 and the additional information 122a as a first data packet.

Similar to the data 106, the data 108 generated by the second sensor system 104b may also include second information 118b that includes second timestamp information ($t_2$) 120b and second probability data ($P_2$) 122b. For instance, the data 108 may be output as a data packet including the data 108 and the second information 118b. The second timestamp information 120b may include a time at which the data 108 was captured by the second sensor system 104b and/or a time at which the data was sent from or published by the second sensor system 104b. The second probability data 122b may be a quantification of a certainty of the data 108. For instance, the second probability data 122b may be a probability distribution including a range of values including a measured or most certain value within the range. In examples, the second sensor system 104b may generate the second probability data 122b based on functionality, errors, and/or limitations of the second sensor system 104b. As above, the second probability data 122b may be determined based at least in part on a probabilistic model of the autonomous vehicle 102, as described herein. In at least some examples, the second probability data 122b may be a likelihood that the data 108 is accurate and/or a likelihood that the data 108 is anomalous.

FIG. 1 also illustrates that the data 106, 108 is transmitted to or otherwise received by the first computing subsystem 110 and/or the second computing subsystem 112 of the autonomous vehicle 102. The data 114 generated by the first computing subsystem 110 and the data 116 generated by the second computing subsystem 112, e.g., using the data 106 and/or the data 108, also includes additional information. Specifically, the data 114 includes third timestamp information ($t_3$) 120c and third probability data ($P_3$) 122c. Similarly, the data 116 includes fourth timestamp information ($t_4$) 120d and fourth probability data ($P_4$) 122d. The third and fourth timestamp information 120c, 120d may include a time at which the respective data 114, 116 was generated, a time at which the data 114, 116 was sent, e.g., transmitted or published, by the first computing subsystem 110 or the second computing subsystem 112. The third and fourth probability data 122c, 122d may be information associated with a certainty of the data 114, 116, respectively. The third and fourth probability data 122b may be a quantification of a certainty of the data 114, 116.

As also illustrated in FIG. 1, the first computing subsystem 110 includes an accuracy determination component 124 and the second computing subsystem 112 includes an accuracy determination component 126. The accuracy determination components 124, 126 include functionality to determine the third probability data 122c and the fourth probability data 122d, respectively. For instance, the accuracy determination component 124 may determine the third probability data based at least in part on the first probability data 122a, the second probability data 122b, and/or other probability data associated with other data used to determine the data 114. The accuracy determination component 124 may also determine the third probability data based at least in part on uncertainty associated with the function(s) performed by the first computing subsystem 110. Without limitation, the first computing subsystem 110 may process the data 106, the data 108, and/or additional data using one or more models, algorithms, or the like, and the accuracy determination component 124 can use uncertainty associated with the models/algorithms to determine the third probability data 122c. Stated differently, the accuracy determination component 124 can determine the third probability data 122c as a function of the first probability data 122a, the second probability data 122b, and an error associated with the first computing subsystem 110. The accuracy determination component 126 can similarly determine the fourth probability data 122d as a function of at least the first probability data 122a, the second probability data 122b, and an error associated with the second computing subsystem 112. As detailed below, with reference to FIG. 2, the first sensor system 104a, the second sensor system 104b, the first computing subsystem 110, the second computing subsystem 112, and additional systems/subsystems of the autonomous vehicle 102 can be modeled as a probabilistic graphical model, e.g., as a Bayesian network. The probability data 122a, 122b, 122c, 122d can be determined in accordance with the probabilistic model. Although the accuracy determination components 124, 126 are illustrated as being incorporated in the first and second computing subsystems 110, 112, respectively, the functionality of the accuracy determination components 124, 126 may be performed other than at the computing subsystems. For instance, the functionality of the accuracy determination components 124, 126 may be incorporated in a single component or subsystem in communication with the sensor systems 104 and/or the computing subsystems 110, 112.

As detailed further herein, techniques of this disclosure can use information about the data, e.g., the timestamp data 120 and/or the probability data 122, to determine capabilities of the autonomous vehicle 102. For instance, the autonomous vehicle 102 is also illustrated in FIG. 1 as including one or more vehicle control system(s) 128, which may execute various capabilities, e.g., using the data 114 and/or the data 116. For example, the vehicle control system(s) 128 can execute higher level tasks such as identifying and/or modelling objects in the environment 100 of the autonomous vehicle 102, generating and/or following trajectories for travelling in the environment 100, staying within a traffic lane or drive envelope, or the like. The tasks may be required for safe operation.

As also illustrated in FIG. 1, the vehicle control system(s) 128 can include a capability determination component 130 and a control generation component 132. As described herein, aspects of this disclosure relate to determining whether the autonomous vehicle 102 can operate safely in the environment 100, e.g., by safely performing tasks at the vehicle control system(s). Generally, the capability determination component 130 can determine, e.g., for individual tasks, whether the vehicle control system(s) 128 can execute tasks and the control generation component 132 can generate vehicle control commands 134 implemented at the autonomous vehicle 102 to execute the tasks.

In more detail, in the illustrated example, the capability determination component 130 can receive the third probability data 122c and the fourth probability data 122d and determine based at least in part on those probabilities whether the autonomous vehicle 102 can perform a specific task that utilizes the data 114 and the data 116. As detailed further below in connection with FIGS. 2 and 3, the capability determination component 130 can further receive or access error or accuracy data, e.g., as a capability metric, associated with the task to be performed. For instance, when the task is generating a trajectory for the autonomous vehicle 102 to travel in the environment 100, the capability determination component 130 can determine a likelihood that the trajectory can be generated from errors in the trajectory generation algorithms, models, or the like, as well as probability information associated with a current vehicle state and/or a state of an object relative to which the autonomous vehicle 102 is to travel. In examples, the capability determination component 130 can be similar to or the same as the accuracy determination components 124, 126.

Figure 2:
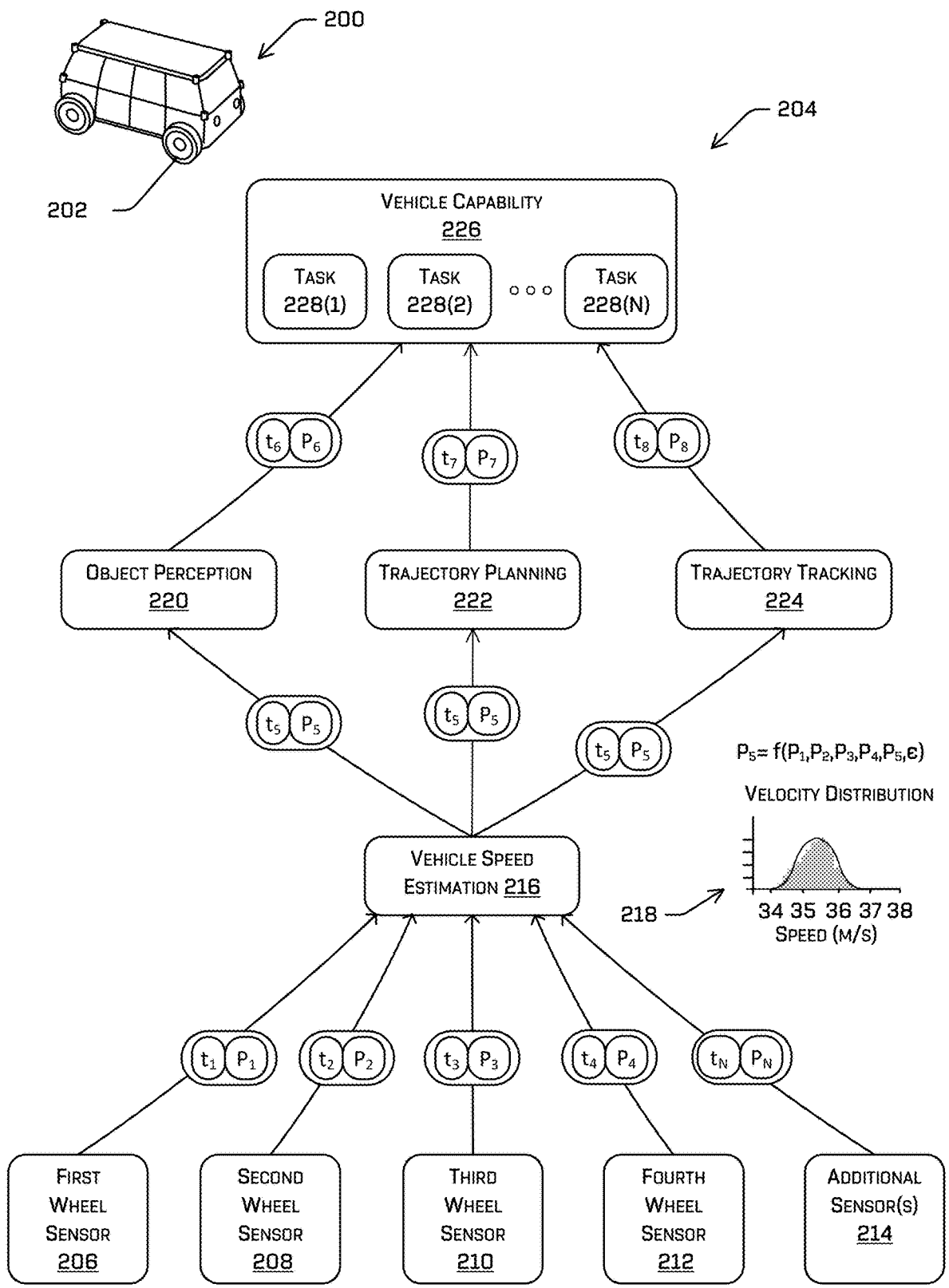
FIG. 2 is an example graphical model representing aspects of an autonomous vehicle, such as the autonomous vehicle of FIG. 1, according to aspects of this disclosure.

In some examples of this disclosure, the capability determination component 130 implements a graphical probabilistic model of the autonomous vehicle 102 to determine whether a task or function can be performed. In the example of FIG. 1, the vehicle control system(s) 128 may correspond to root nodes in the probabilistic model, with the first and second computing subsystems 110, 112 being leaves of the root node(s) and the sensor systems 104 being leaves of the computing subsystems 110, 112. According to this arrangement, the capability determination component 130 can evaluate whether the autonomous vehicle can perform specific tasks at the vehicle control system(s) 128 based on the probabilities associated with nodes depending therefrom. FIG. 2, discussed in more detail below, shows a specific example of the graphical probabilistic model.

The control generation component 132 may receive information from the capability determination component 130 and generate the vehicle control commands 134. In one example, the capability determination component 130 may make a binary decision, e.g., capable/not capable relative to individual tasks. In this example, when the vehicle 102 is capable of executing the task(s) the vehicle may function according to a normal state or configuration. Alternatively, if the capability determination component 130 is not capable of determining the task(s), the control generation component 132 may control the vehicle 102 by issuing a safe state control as the vehicle control command 134. For example, the safe state control can control the vehicle 102 to execute a safe stop maneuver. An example safe stop maneuver may include controlling the vehicle 102 to follow a trajectory, e.g., along which the vehicle 102 can safely navigate to the side of the road. Once on the side of the road, the vehicle 102 may be placed in a safety state, e.g., in which some or all functionality is disabled. The vehicle 102 may remain in this state until further diagnostics or the like are carried out, e.g., to determine a source of an anomalous latency event and/or to correct the event.

In other examples, instead of making a binary determination, the capability determination component 130 may determine a probability associated with performing the task(s). This probability may be used to operate the vehicle 102 in a modified or restrictive state. For instance, instead of bringing the vehicle 102 to a complete stop, the control generation component 132 may generate the vehicle control commands 134 as commands to control the vehicle 102 to slow down. For example, the autonomous vehicle 102 may be more tolerant of errors when travelling at a lower speed.

Thus, FIG. 1 illustrates example systems and techniques for determining vehicle capabilities. In some examples, probabilities may be generated and associated with discrete data outputs of systems (including the sensor systems 104, the computing subsystems 110, 112 and the control system(s) 128). The systems of the autonomous vehicle 102 may be modelled as a graphical probabilistic model in which probabilities associated with relatively lower-level functioning are propagated to systems performing relatively higher-level functioning. Modelling the vehicle systems in this manner, and generating the probability data 122 at each output (and each instances of each output) provides an improved system over conventional systems. Specifically, many conventional systems use if/then logic to determine whether tasks can be performed. For instance, in some conventional systems, if data from a sensor is not received, or is not received on time, then the vehicle 102 is stopped and/or assistance is requested. However, modelling the autonomous vehicle 102 according to examples described herein allows for a better assessment of the autonomous vehicle 102, including a more complete assessment of whether the autonomous vehicle 102 can perform tasks necessary for completion of tasks, including safety-critical tasks required to safely transport passengers.

FIG. 2 is an example graph providing a visualization of subsystems of a vehicle 200, which may be the autonomous vehicle 102. The vehicle 200 is illustrated as including a plurality of wheels 202 (two of which are shown) for transporting the vehicle 200. FIG. 2 illustrates a graph 204 visualizing systems of the autonomous vehicle 200 as nodes in a graphical probability model. In the example, and as detailed further below, the systems may be based on information generated by sensors associated with the wheels 202. However, while aspects of FIG. 2 are described in connection with specific examples of sensor(s) and/or computing system(s) that are related, directly or indirectly, to the wheels 202, it will be appreciated that this is for example only. In some implementations, additional, other, and/or all sensing and computing systems of the autonomous vehicle 200 may be represented in the graph 204, with data from those sensors and systems being similarly considered as the examples shown in FIG. 2 and discussed herein.

Proximate the bottom of FIG. 2, the graph 204 includes a first node 206 representing a first wheel sensor, a second node 208 representing a second wheel sensor, a third node 210 representing a third wheel sensor, and a fourth node 212 representing a fourth wheel sensor. In examples, individual of the wheel sensors may be associated with individual of the four wheels 202. The wheel sensors may be configured to generate and output a speed of the respective wheel. The wheel sensors may be examples of the sensor systems 104.

Each instance of data output by the wheel sensor(s) includes time information (t) and probability data (P). For example, the time data may be a timestamp associated with sensing, generating, and/or transmitting data generated at the sensor. In other instances, the time information can be an elapsed time, e.g., between iterations of the data generated by the sensor. The time information may correspond to the time data 120 discussed above in connection with FIG. 1. The probability data may be a probability associated with the speed data output by the wheel sensor. Without limitation, the probability may include or be based at least in part on a confidence, a margin of error, and/or a tolerance associated with the respective sensor/system. The probability may be a probability distribution in some examples.

The graph 204 also illustrates a fifth node 214 representing additional sensor(s). In examples, the graph 204 may include a number of nodes corresponding to a number of sensors. In the representation, the first through fifth nodes 206, 208, 210, 212, 214 may be leaf nodes corresponding to a lowest level of functionality in the vehicle 200. Thus, for example, all sensors that generate data based on observed or sensed behavior, and that supply such data to another system, may be represented on the lowest level of the graph 204. Moreover the output of each of these nodes may have an associated time and/or an associated probability. In at least some examples, such nodes indicated in FIG. 2 may represent more complex subgraphs. As a non-limiting example, the node 214 may be associated with the output of a subsystem which determines vehicle speed and/or wheel speed based on a combination of such additional sensor data (e.g., lidar, camera, radar, GPS, etc.).

The graph 204 illustrates that the outputs of the sensors represented by the first through fifth nodes 206, 208, 210, 212, 214 are received at a sixth node 216 associated with a vehicle speed estimation system. In examples, the vehicle speed estimation system receives the outputs from the four-wheel sensors, and optionally from one or more additional sensors, and estimates a vehicle speed. For instance, the vehicle speed estimation system can determine a speed of the vehicle by averaging the speeds of the four wheels 202 determined by the wheel sensors and/or any additional sensors. In some examples, the vehicle speed estimation system can be incorporated into a state determination system that determines a state of the vehicle. The state can include the velocity of the vehicle 200, as well as an acceleration, a heading, a position, and/or any other data associated with the vehicle's 200 state.

In examples of this disclosure, processing associated with the sixth node 216 determines probability data associated with the determined speed. In FIG. 2, this probability is shown as the probability $P_5$. As also shown in FIG. 2, the probability $P_5$, may be a function of the probabilities of each of the inputs into the node 216 (e.g., the probabilities $P_1$, $P_2$, $P_3$, $P_4$), as well as an error associated with the vehicle speed estimation system. For example, the error associated with the vehicle speed estimation system may be associated with an algorithm or model used to determine the estimated speed, e.g., as opposed to probability information associated with the various inputs to the vehicle speed estimation component. As shown in FIG. 2, the estimated speed determined by the vehicle speed estimation component is illustrated as a velocity distribution 218, e.g., a probability distribution. In some examples, the probability $P_5$ can be a Bayesian probability based on the probabilities of the leaf nodes dependent from the sixth node 216.

As also shown in FIG. 2, the graph 204 further includes a seventh node 220 associated with an object perception system, an eighth node 222 representative of a trajectory planning system, and a ninth node 224 associated with a trajectory tracking system. As represented by the edges in the graph 204, data from the sixth node 216 (e.g., vehicle speed) may be provided to each of the object perception system, the trajectory planning system, and the trajectory tracking system. For example, the object perception system may use a current speed of the vehicle to determine a speed of an object in an environment of the vehicle. The trajectory planning system and the trajectory tracking system may also require the current speed of the vehicle, e.g., to plan a new trajectory and/or or ensure that the vehicle 200 is following a determined trajectory. Although not shown in FIG. 2, the nodes 220, 222, 224 may be connected to additional lower level nodes, e.g., representing other inputs to the respective systems. Without limitation, the object perception component may receive information about a three-dimensional bounding box describing a perceived object, information about a current position and/or heading of the vehicle 200, and/or other data. Similarly, the trajectory planning and/or the trajectory tracking systems will require data from subsystems in addition to the vehicle speed estimation system to perform their respective functions.

In examples, probability data will also be determined for outputs of each of the systems represented by the nodes 220, 222, 224. For instance, the output of the object perception system represented by the seventh node 220 may have an associated probability, $P_6$. The probability $P_6$ may be a function of the probability $P_5$ associated with the speed data received from the vehicle speed estimation component. As will be appreciated, because the probability $P_5$ is a function of the probabilities, $P_1$, $P_2$, $P_3$, $P_4$, the probability $P_6$ is also based on these probabilities. The probability $P_6$ may also be a function of any additional probabilities associated with additional data to generate and output object perception data. The probability $P_6$ also may be based at least in part on an error or uncertainty associated with the processing of the object perception system. Using the tree structure of the graph 204, probabilities are carried from lower level systems to higher level systems through the vehicle 200 to provide a better understanding of capabilities of the vehicle 200. In examples, the vehicle 200 may include dozens or even hundreds of sensors, each with their own error, providing data to several subsystems that perform dozens or even hundreds of functions, the output(s) of which are then used by higher level systems to ultimately control the vehicle. By propagating the probabilities through the system, the ability of the vehicle to perform certain, e.g., critical, functions can be estimated, and the vehicle can be controlled based thereon.

In the graph 204, a root node 226 visualizes a vehicle capability. As illustrated, the vehicle capability can be visualized as one or more tasks 228(1), 228(2), . . . 228(N), where N is an integer. In the example of FIG. 2, each of the tasks 228 may be a mission critical function. For example, the tasks 228 may correspond to the vehicle's 200 ability to stay in a traffic lane, ability to generate a trajectory, ability to follow a trajectory, ability to avoid an object, or other higher-level tasks. In examples, each of the tasks 228 may be represented as a leaf depending from the root node 226. For example, the root node 226 may correspond to the overall ability of the vehicle to operate safely, where that ability is further based on the vehicle's ability to execute the individual tasks 228.

The graph 204 provides an improved model for the vehicle 200. Unlike conventional systems that considered only a single data source or single subsystem, the graph 204 provides data about the entire vehicle 200, which can lead to safer and more consistent operation of the vehicle 200. For instance, because the model generates probability information for each node, as the data at each node is used in connected, higher level nodes, the ability to perform tasks is better modelled. In the example of FIG. 2, conventionally if the data associated with one of the wheel sensors was anomalous, e.g., because the sensor was malfunctioning, the vehicle 200 may be stopped. However, by assessing probabilities at each level of data and at each instance of data generation, the vehicle 202 may determine that certain tasks are still capable of being performed, e.g., even with the anomalous data. Similarly, the graph 204 may better account for tolerance stack-up within the system. For instance, while each individual system or sensor may output data within an expected tolerance, those tolerances may add up as the data progresses through functions of the vehicle, such that although no single system is providing anomalous data, the combination of all probabilities can identify that some task or operation is unsafe.

As also illustrated in examples, the vehicle capabilities can also be based at least in part on the time information. Without limitation, the time information may indicate whether data is stale and/or if data is not being output at an expected frequency.

Figure 3:
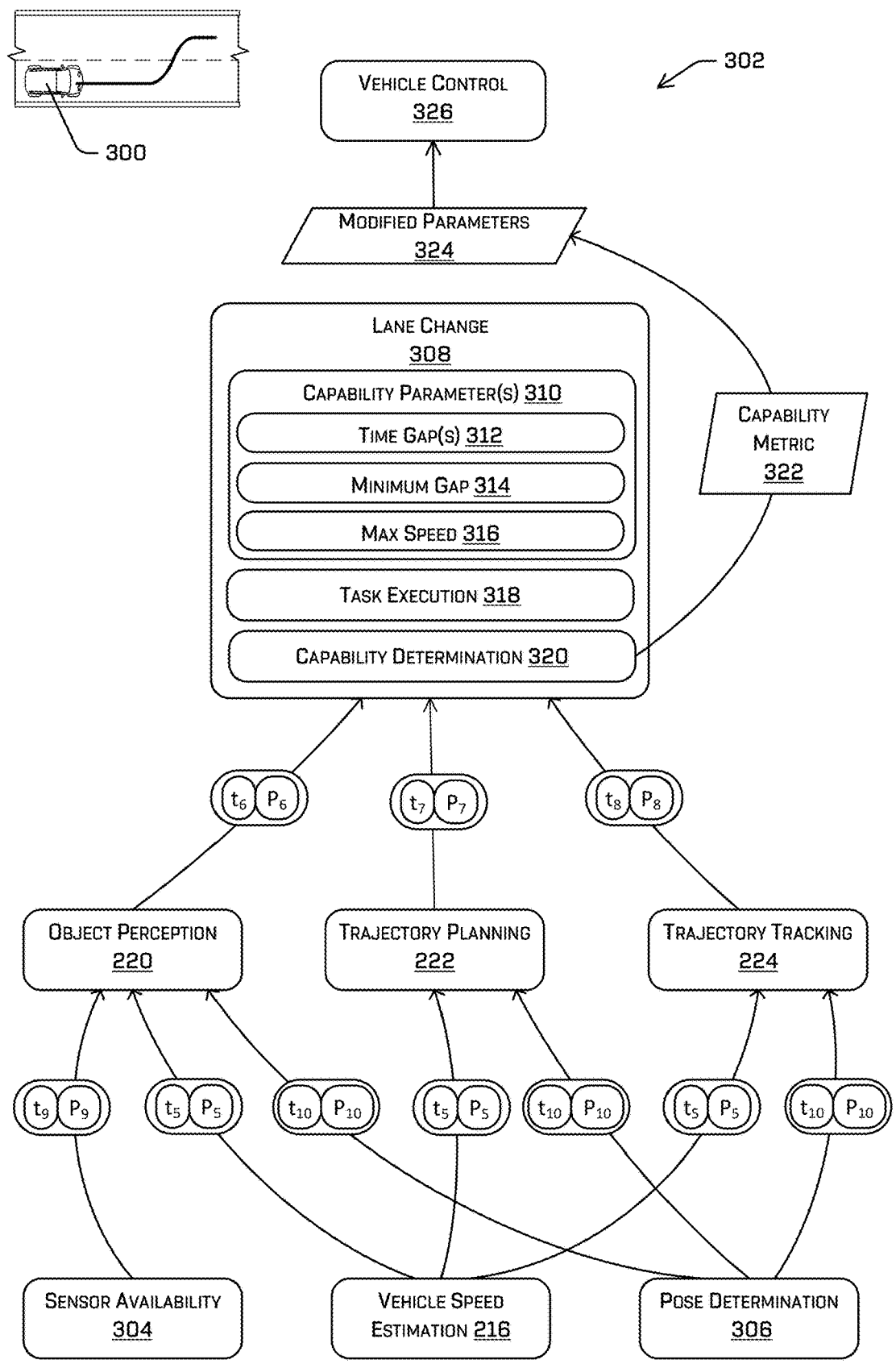
FIG. 3 is an example graphical model representing additional aspects of an autonomous vehicle, such as the autonomous vehicle of FIG. 1 or FIG. 2, according to aspects of this disclosure.

FIG. 3 is an example graph providing a visualization of subsystems of a vehicle 300, which may be the autonomous vehicle 200. More specifically, FIG. 3 illustrates a graph 302 that includes portions of the graph 204. As detailed further below, the graph 302 illustrates aspects of an example implementation of the graph 204 in which uncertainty data from the nodes 220, 222, 224 (representing the object perception system, the trajectory planning system, and the trajectory tracking system) is used to perform a specific task, e.g., changing a lane. While aspects of FIG. 3 are described in connection with specific examples of sensor(s) and/or computing system(s) that are related to a specific task, it will be appreciated that this is for example only. In some implementations, additional, other, and/or all sensing and computing systems of the autonomous vehicle 300 may be represented in the graph 302, with data from those sensors and systems being similarly considered as the examples shown in FIG. 3, and discussed herein.

Like FIG. 2, FIG. 3 includes a plurality of nodes, each representing a computing system, subsystem, sensor, or other data generating component. FIG. 3 includes the node 216, corresponding to the vehicle speed estimation component, the node 220, corresponding to the object perception system, the node 222 corresponding to the trajectory planning system, and the node 224, corresponding to the trajectory tracking system. As with the example of FIG. 2, data output by the vehicle speed estimation component is received at each of the object perception system, the trajectory planning system, and the trajectory tracking system, for use in association with processing functionality carried out by those systems. The data output by the vehicle speed estimation component also includes the time data ($t_5$) and the probability data ($P_5$), as discussed above.

Proximate the bottom of FIG. 3, the graph 302 also includes a first node 304 labelled "sensor availability" and a second node 306 labelled "pose determination." As in FIG. 2, the nodes 304, 306 are associated with additional aspects of the vehicle 300 that generate and output data. For instance, the sensor availability component is configured to determine whether sensors are functioning properly. In examples, the sensor availability component may receive information for some or all of the sensor systems 104. Without limitation, the sensor availability component can determine whether one or more sensors have faults, are occluded or obstructed, or the like. The pose determination component is configured to determine a pose of the vehicle. For instance, the pose may include details about a position and/or heading of the autonomous vehicle 300 in a local or global coordinate system, including information about a two- or three-dimensional position and about an orientation about one, two, or three axes. As also shown in FIG. 3, data generated by the sensor availability component may include associated time information $t_9$ and probability data $P_9$, and data generated by the pose determination component may include associated time information $t_{10}$ and probability data $P_{10}$, which may be substantially the same as the time information and probability data discussed above.

In the example of FIG. 3, the data (with accompanying time information and probability data) generated by the sensor availability component, the vehicle speed estimation system, and the pose determination component are received at the object perception system, whereas only data from the vehicle speed estimation system and the pose determination component are received at the trajectory planning system and the trajectory tracking system. In examples, the trajectory planning system and the trajectory tracking system may not rely on the same sensors used by the object perception system, so data about sensor availability processed by the object perception system is not useful or required at the trajectory planning and/or trajectory tracking systems.

As with the example of FIG. 2, the data output by the object perception system, the trajectory planning system, and the trajectory tracking system (as well as other systems, subsystems, and/or components) may be used by higher-level systems of the vehicle 300 to implement various tasks at the vehicle 300. FIG. 3 is an example relating to implementation of a lane change task 308. For instance, the lane change task 308 may facilitate movement of the vehicle 300 into an adjacent lane to avoid an obstruction, to pass a slower-moving vehicle, to execute a merge, or for any other reason.

The ability of the vehicle 300 to perform the lane change task 308 is based at least in part on a number of capability parameter(s) 310. The capability parameter(s) 310 generally include conditions, states, or factors that are related to performance of the lane change task 308. In examples, the capability parameter(s) 310 may be a finite number of conditions that define the dynamic bounds of the vehicle 300 necessary for performance of the lane change task 308. FIG. 3 specifically illustrates the capability parameter(s) 310 as including time gap(s) 312, a minimum gap 314, and a maximum speed 316. The time gap(s) 312 may refer to a time gap between the vehicle 300 and one or more other vehicles proximate the vehicle 300. For instance, the time gap may be a time gap between the vehicle 300 and a vehicle immediately in front of the vehicle 300 and/or a time gap between the vehicle 300 and a vehicle in the lane into which the vehicle 300 is to travel. Practically, the time gap(s) 312 relate to how far other vehicles are from the vehicle 300. The minimum gap 314 may refer to a length of a gap in the lane into which the vehicle is to move. For instance, the minimum gap may be a distance between two vehicles already travelling in the lane into which the vehicle 300 is to merge. In other instances, the gap may be two-dimensional, e.g., including a width, and/or may be other than measured as a length, e.g., a time gap. The maximum speed 316 may refer to the maximum speed of the vehicle 300 at which the lane change is deemed safe. Of course, the listed capability parameter(s) 310 are for example only; more, fewer and/or different parameters may be required to execute the lane change task 308. Without limitation, the capability parameter(s) 310 could further include a minimum speed, speed of surrounding vehicles, or the like. Moreover, different tasks will require different parameters. In some examples, the appropriate parameters, and values associated with those parameters, may be determine at least in part based on safety analyses associated with the capability and/or the systems relied upon to perform the capability. The parameters may also be determined based on offline, e.g., simulated, testing and verification, empirical studies, driving logs, and/or the like.

In the example, the lane change task 308 also has an associated task execution component 318. For example, the task execution component 318 may include functionality to process data from various sources, e.g., the object perception system, the trajectory planning system, the trajectory tracking system, or the like, to determine whether the capability parameter(s) 310 are met. Conventionally, the task execution component 318 may, based on the received data, make a binary determination of whether the lane change task 308 could be executed, based on the received data indicating that conditions comport with the requirements of the parameters, or the lane change task could not be executed, because the parameters were not met and/or because the data was faulty. Stated differently, the task execution component 318 may determine whether the task can be performed according to a nominal performance or not at all.

In aspects of this disclosure, the lane change task 308 also has an associated capability determination component 320, which may be similar to or the same as the capability determination component 130. The capability determination component 320 includes functionality to receive the time information (t) and probability data (P) associated with the inputs from the object perception system, the trajectory planning system, the trajectory tracking system, and/or any other systems, sub-systems, or components, and generate a vehicle capability metric 322. The vehicle capability metric 322 is a metric that generally indicates a "health" of the vehicle 300, pertaining to one or more tasks. For instance, the vehicle capability metric 322 is a representation, e.g., numerical, probabilistic, or other indication, generated based on the time information and/or the probability data that indicates a likelihood, certainty, or confidence associated with execution of the lane change task 308. In a non-limiting example, when the capability metric is above a threshold, the lane change task may be performed according to normal functionality, e.g., the vehicle 300 is "healthy" enough to execute the task. However, when the capability metric is below that threshold, the vehicle 300 may not be able to perform the lane change task 308. As described herein, because the uncertainties associated with data sources and computing systems are propagated through the model of the vehicle 300, e.g., from system-to-system as data is generated and transferred, a better understanding of functional capabilities is achieved.

Techniques according to this disclosure also facilitate dynamic parameterization of tasks. Consider an example in which the vehicle 300 is travelling along a road and would like to execute a lane change maneuver to get around a slower-moving vehicle. In this example, a perception sensor, e.g., a LiDAR or radar sensor has an internal fault that prevents the sensor from being used for object detection. For instance, the unavailable sensor is rear-facing, relative to the direction of travel, but other sensors remain available and functioning nominally in this example. In response to data from the malfunctioning sensor (not illustrated in FIG. 3), the sensor availability component sends data to the object perception system indicating that the sensor is unavailable and/or with information about other sensors, including time information and probability data. Because of the faulty sensor, object detection to the rear is degraded, resulting in lower confidence in some or all of the results of the object perception system. For example, the lane change may still be possible, but the sensor fault may cause reduced coverage of the required field of view and/or result in an increased latency in the perception functioning of the object perception system. Thus, data from the object perception system used to execute the lane change task may be degraded (as quantified in the uncertainty associated with $P_6$), and the time associated with receipt of the data from the object perception may vary, (as quantified by the time information $t_6$).

Because of the circumstances associated with the data, the capability determination component 320 may determine that capabilities associated with performing the lane change task 308 are reduced or degraded. In the example of FIG. 3, the capability determination component 320 generates the capability metric, and the value of the capability metric is such that the vehicle cannot perform the lane change task 208 according to nominal functionality. Stated differently, the capability metric indicates that the vehicle 300 is currently not capable of safely performing the lane change task.

However, aspects of this disclosure include performing the task according to modified functionality. Continuing with the example from above, because only perception for some field of view is delayed and/or more unreliable, the vehicle may still be able to perform the lane task, for example, if the time to execute the task is increased. In the example, increasing the time gaps between the vehicle 300 and other vehicles, increasing the minimum gap into which the vehicle 300 is to merge, and/or reducing the maximum operational speed of the vehicle may provide additional time and/or space for the vehicle 300 to change lanes.

FIG. 3 includes modified parameters 324. In implementations, the modified parameters may be associated with the value, or values, of the vehicle capability metric 322. Without limitation, when the capability metric 322 is equal to or above a first threshold capability metric, the lane change task 308 may be implemented according to the capability parameter(s) 310, e.g., according to nominal functionality. In contrast, when the capability metric is below the first threshold capability metric, but above a second threshold capability metric, implementation of the lane change task 308 may be contingent upon the modified parameters being met. Thus, different thresholds and/or ranges of capability metrics may be associated with different or differently-valued task parameters. Thus, vehicle control 326 can be implemented using control commands generated in accordance with the different parameter(s), based on the current capabilities of the vehicle 300.

As will be appreciated, FIG. 3 illustrates a specific example task, and implementation of that task. The task may be performed differently, e.g., based on more or less data from more or fewer sources, according to different parameters, or the like. Moreover, the disclosure is not limited to the illustrated task. As discussed above in connection with FIG. 2, techniques described herein may be used to implement any number of tasks, including mission-critical tasks. By applying the principles of this disclosure to different tasks, vehicle capabilities may be assessed in real time, and can be used to modify functioning of the vehicle in a manner that reduces the number of faults and/or disruptions.

Figure 4:
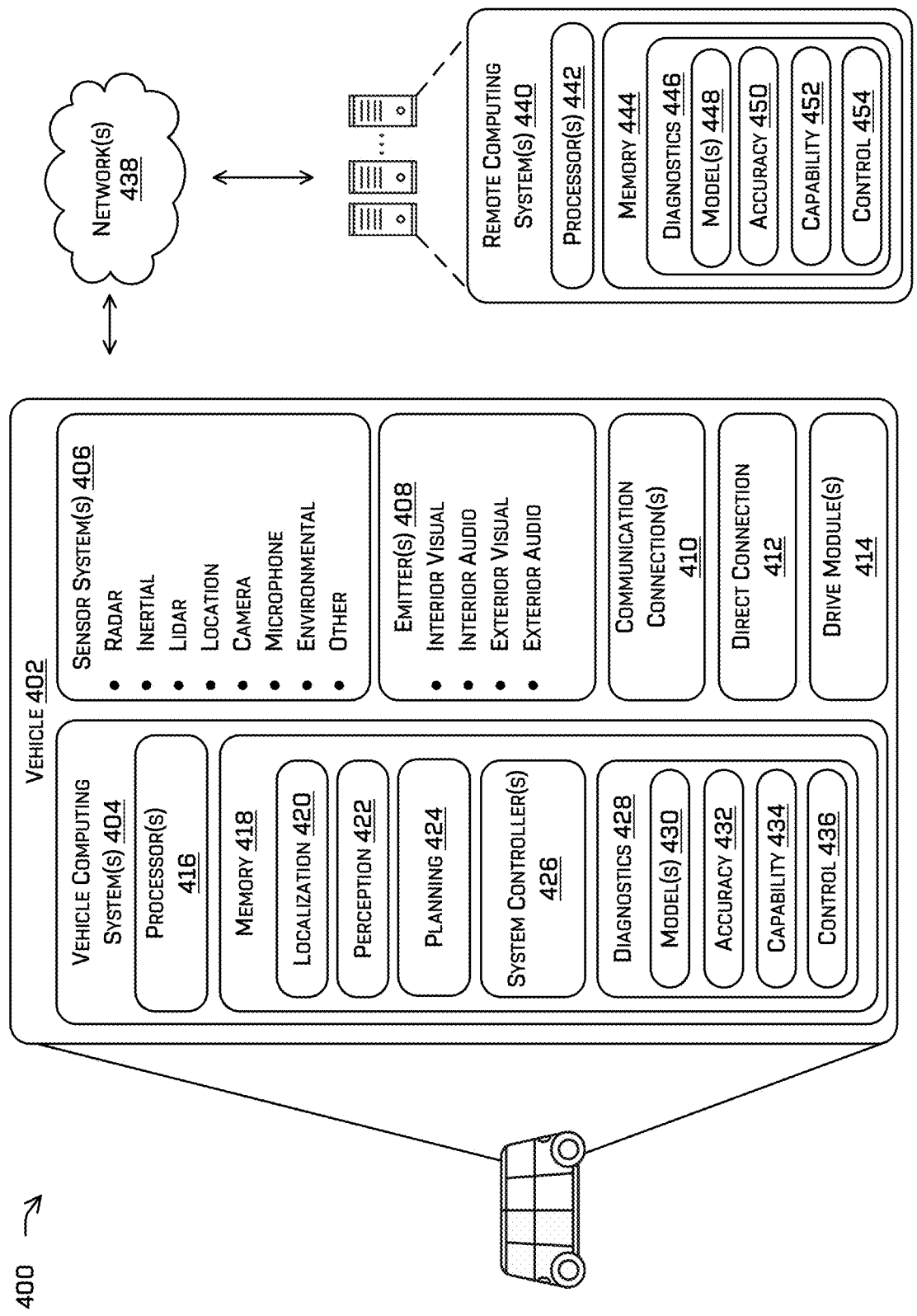
FIG. 4 is a block diagram of an example architecture for assessing vehicle capabilities, according to aspects of this disclosure.

FIG. 4 depicts a block diagram of an example architecture 400 for implementing the techniques discussed herein. In at least one example, the architecture 400 can include a vehicle 402, which can be similar to (or the same as) the vehicle 102 described above with reference to FIG. 1 the vehicle 200 described above with reference to FIG. 2, and/or the vehicle 300 described above with reference to FIG. 3. In the illustrated architecture 400, the vehicle 402 is an autonomous vehicle; however, the vehicle 402 can be any other type of vehicle.

The vehicle 402 can include one or more vehicle computing systems 404, one or more sensor systems 406, one or more emitters 408, one or more communication connections 410, at least one direct connection 412 (e.g., for physically coupling with the vehicle 402 to exchange data and/or to provide power), and one or more drive modules 414. In some instances, the vehicle 402 can include additional instances of the vehicle computing system(s) 404.

The vehicle computing system(s) 404 can include one or more processors 416 and memory 418 communicatively coupled with the one or more processor(s) 416. In the illustrated example, the memory 418 of the vehicle computing system(s) 404 stores a localization system 420, a perception system 422, a planning system 424, one or more system controller(s) 426, and a diagnostics system 428. The diagnostics system 428 includes one or more models 430, an accuracy component 432, a capability component 434, and a control component 436. Though depicted as residing in the memory 418 for illustrative purposes, it is contemplated that the localization system 420, the perception system 422, the planning system 424, the one or more system controllers 426, and/or the diagnostics system 428 can additionally, or alternatively, be accessible to the computing system(s) 404 (e.g., stored in a different component of vehicle 402 and/or be accessible to the vehicle 402 (e.g., stored remotely)). Moreover, although certain features and functionality may be ascribed to various systems and components, such is for example only. The features and functions may be associated with and/or performed by other or additional components. Moreover, some functionality ascribed to a specific system or component may be distributed across multiple systems/ components.

In at least one example, the localization system 420 can include functionality to receive data from the sensor system(s) 406 to determine a position of the vehicle 402. In some implementations, the localization system 420 can include and/or request/receive a three-dimensional map of an environment and can continuously determine a location of the autonomous vehicle within the map. In some instances, the localization system 420 can use SLAM (simultaneous localization and mapping) or CLAMS (calibration, localization and mapping, simultaneously) to receive image data, such as from the time-of-flight sensor, LIDAR data, RADAR data, SONAR data, IMU data, GPS data, wheel encoder data, or any combination thereof, and the like to accurately determine a location of the autonomous vehicle 402. In some instances, the localization system 420 can provide data, e.g., by publishing data according to techniques described herein, to various components of the vehicle 402 to determine an initial position of an autonomous vehicle for generating a candidate trajectory, as discussed herein.

In some examples, the perception system 422 can include functionality to perform object detection, segmentation, and/or classification. For instance, the perception system 422 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception system 422 can provide, e.g., by publishing, processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning system 424 can determine a path for the vehicle 402 to follow to traverse through an environment. For example, the planning system 424 can determine various routes and trajectories and various levels of detail. For example, the planning system 424 can determine a route to travel from a first location (e.g., a current location) to a second location (e.g., a target location). For the purpose of this discussion, a route can be a sequence of waypoints for traveling between two locations. As non-limiting examples, waypoints can include streets, intersections, global positioning system (GPS) coordinates, etc. Further, the planning system 424 can generate an instruction for guiding the autonomous vehicle along at least a portion of the route from the first location to the second location. In at least one example, the planning system 424 can determine how to guide the autonomous vehicle 402 from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning system 424 can alternatively, or additionally, use data from the perception system 422 to determine a path for the vehicle 402 to follow to traverse through an environment. For example, the planning system 424 can receive data from the perception system 422 regarding objects associated with an environment. Using this data, the planning system 424 can determine a route to travel from a first location (e.g., a current location) to a second location (e.g., a target location) to avoid these objects in the environment.

In at least one example, the vehicle computing system(s) 404 can include one or more system controller(s) 426, which can be configured to control steering, propulsion, braking, safety, emitters, communication, and other systems of the vehicle 402. The system controller(s) 426 can communicate with and/or control corresponding systems of the drive module(s) 416 and/or other components of the vehicle 402, which may be configured to operate in accordance with a trajectory provided from the planning system 424. In techniques described herein, the system controller(s) 426 can receive information about control commands, such as the vehicle control commands 134.

Although not required, in some instances, the localization system 420, the perception system 422, the planning system 424, and the system controller(s) 426 can act serially. For instance, the localization system 420 can receive data, e.g., sensor data, and, using the sensor data, generate and output localization system data. The localization system data then can be received at the perception system 422, which can use the localization system data to generate perception system data. The perception system data may then be received at the planning system 424, which may use the perception system data to generate planning system data, and so forth. However, in other instances, data may be received at (and used by) multiple different systems for performing many different functions.

The diagnostics system 428 can be configured to determine capabilities of the vehicle 402, e.g., to facilitate safe operation of the vehicle 402, to ensure that the vehicle 402 is operating within safe parameters, and/or to control the vehicle when the vehicle is not operating within the safe parameters. As illustrated, the diagnostics system 428 can include the model(s) 430, the accuracy component 432, the capability component 434, and the control component 436. Although the diagnostics system 428 is illustrated as a single block in the memory 418, a separate diagnostics system 428 and/or aspects of the diagnostics system 428 can be included in or accessible to individual of the systems and/or components. By way of non-limiting example, the sensor system(s) 406 may incorporate the accuracy component 432.

The control component 436 can determine and output one or more actions in response to the capabilities of the vehicle. For example, the control component 436 may generate control commands to control the vehicle. In some examples, the control component 436 can generate modified control commands that control the vehicle in a restrictive functioning.

In at least one example, the sensor system(s) 406 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the computing system(s) 404, e.g., by publishing sensor data in accordance with examples described herein.

The vehicle 402 can also include one or more emitter(s) 408 for emitting light and/or sound, as described above. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include the one or more communication connection(s) 410, which may enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 can also enable the vehicle 402 to communicate with a remote teleoperations computing device or other remote services.

The communications connection(s) 410 can include physical and/or logical interfaces for connecting the computing system(s) 404 to another computing device or a network (e.g., the Internet), such as a network 438. For example, the communication connection(s) 410 can enable Wi-Fi-based communication such as via frequencies defined by the IEEE 802.11 standards, short range wireless frequencies such as Bluetooth, cellular communication (e.g., 2G, 4G, 4G, 4G LTE, 4G, etc.) or any suitable wired or wireless communications protocol that enables the respective computing device to interface with the other computing device(s).

As noted above, the direct connection 412 can physically couple devices to the vehicle 402, e.g., to exchange data and/or to provide power. In some examples, the direct connection 412 may provide a point of access to one or more client computing systems, for example.

The vehicle 402 can also include the drive module(s) 414. In some examples, the vehicle 402 can have a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 414. In some cases, the sensor system(s) on the drive module(s) 414 can overlap or supplement corresponding systems of the vehicle 402 (e.g., the sensor system(s) 406).

The drive module(s) 414 can include many additional vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

As noted above, FIG. 4 also illustrates one or more remote computing systems 444. For example, the remote computing system(s) 440 may be one or more computing devices in communication with the vehicle 402, e.g., via the network 438. In other examples, the remote computing system(s) 440 may be directly connected to the vehicle 402, e.g., via the direct connection 412.

The remote computing system(s) 440 can include processor(s) 442 and memory 444 communicatively coupled with the processor(s) 442. In the illustrated example, the memory 444 of the remote computing system(s) 440 stores a diagnostics system 446 including one or more models 448, an accuracy component 450, a capabilities component 452, and a control component 454. In at least one example, the diagnostics system 446 can correspond to at least a portion of the diagnostics component 430. Making some determinations on a remote computing device may be preferable to on-board.

The processor(s) 416 of the vehicle 402, and the processor(s) 442 of the remote computing system(s) 440 can be any suitable processor capable of executing instructions to process data and perform operations as described herein. By way of example and not limitation, the processor(s) 416, 442 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418, 444 may be non-transitory computer-readable media. The memory 418, 444 can store an operating system and one or more software applications, instructions, programs, and/or data to implement the methods described herein and the functions attributed to the various systems. In various implementations, the memory 418, 444 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 418, 444 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 5:
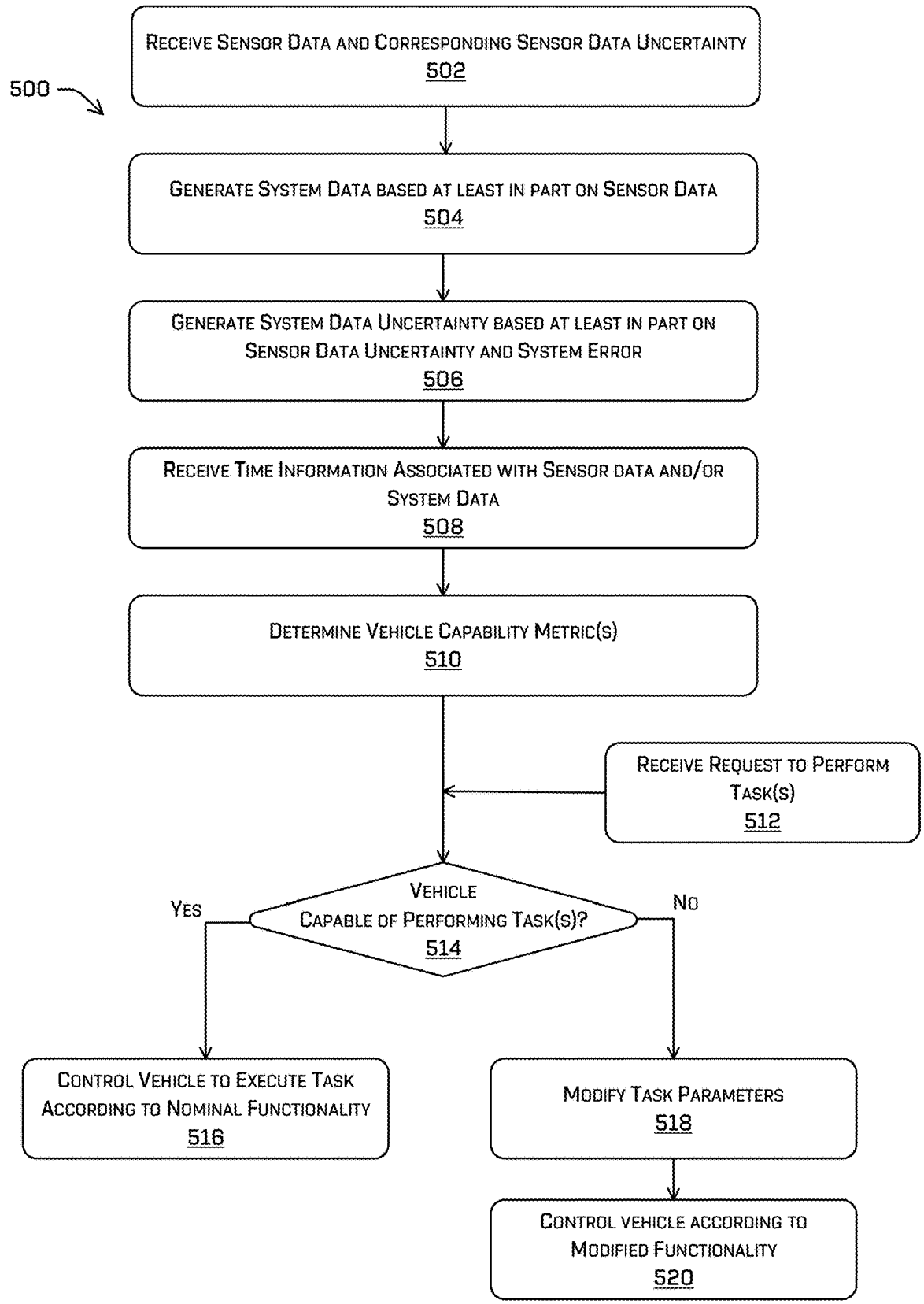
FIG. 5 is a flowchart illustrating an example process for assessing vehicle capabilities, according to aspects of this disclosure.

FIG. 5 illustrates an example process in accordance with embodiments of the disclosure. The process 500 is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 depicts an example process 500 for determining capabilities of an autonomous vehicle. For example, some or all of the process 500 can be performed by one or more of the components illustrated in FIG. 3. For example, some or all of the process 500 can be performed by the vehicle computing system(s) 404 (e.g., using the diagnostics system 330) and/or by the remote computing system(s) 340 (e.g., by the diagnostics system 350).

At operation 502, the process 500 includes receiving sensor data and corresponding sensor data uncertainty. For example, the sensor data uncertainty may be a probability determined by an accuracy determination component and may be based at least in part on errors associated with the sensor.

At an operation 504, the process 500 includes generating system data based at least in part on the sensor data. For example, as in the examples of FIGS. 1, 2, and 3, various computing systems of an autonomous vehicle can receive and process sensor data to determine new information. In the example of FIG. 2, wheel speed data is used to estimate a vehicle speed.

At an operation 506, the process 500 includes generating a system data probability based at least in part on the sensor data probability and a system error. In examples of this disclosure, systems of an autonomous vehicle are modelled as a graphical probabilistic network such that data generated by each node (or system) has an associated probability based on data received at the node. In this example, the system data probability is determined as a function of the probabilities of the data instances received and processed. The system data probability is also based at least in part on an error associated with the system. Thus, in the probabilistic model, each node has a probability based on the data used to process at that node and the process(es) embodied by the node.

At an operation 508, the process optionally includes receiving time information associated with the sensor data and/or the system data. For example, each instance of data generated within the autonomous vehicle system may have an associated time stamp. The time stamp, e.g., when compared to another instance of the data, may determine a frequency or heartbeat associated with the data.

At an operation 510, the process 500 includes determining one or more vehicle capability metrics. For instance, the vehicle may be configured to perform a number of operational-critical tasks, and a vehicle capability metric may quantify or otherwise represent an ability of the vehicle to perform such tasks. The vehicle capability metric may be akin to a "health: measurement of the vehicle, as pertains to one or more functions. As detailed herein, the vehicle capability metric may be determined based on the uncertainty/probability/confidence data associated with data used to implement task(s) at the vehicle.

At an operation 508, the process 500 includes receiving a request to perform one or more tasks. As detailed herein, a task can be any function or action, including mission-critical actions, performed by the vehicle. Such tasks generally rely on data generated based on data from other data sources, as generally illustrated in the graphs 204, 302. FIG. 3 provides a specific example in which a lane change task is implemented, and other tasks can include following a vehicle, travelling in a lane, navigating an intersection, retrieving or dropping off a passenger, or the like.

At an operation 514, the process 500 includes determining whether the vehicle is capable of performing the task(s). For example, when the systems of the autonomous vehicle are modelled as a probabilistic graph, e.g., as a Bayesian probabilistic network, probabilities for individual functions are readily determined and such probabilities are used to determine the vehicle capability metrics, e.g., at the operation 510. In at least some examples, the operation 514 can include comparing one or more of the vehicle capability metrics associated with the task requested at the operation 512 to threshold metrics. For example, a first threshold metric may be a threshold below which the task cannot be performed with nominal functionality, e.g., according to normal functioning.

If at the operation 514, it is determined that the vehicle is capable of performing the task(s), at an operation 516, the process 500 includes controlling the vehicle to execute the task according to nominal functionality. For example, when the model of the autonomous vehicle indicates, based on probabilities propagated through the model, that the vehicle is operating properly, the vehicle is controlled according to normal functionality.

Alternatively, if, at the operation 512 it is determined that the vehicle is not capable of performing the tasks(s), an operation 516 of the process 500 includes modifying task parameters. For example, and as detailed above in connection with FIG. 3, implementation of the task may require a number of conditions or parameters be met. However, when the vehicle capability metric indicates that the vehicle is not performing at a threshold level, e.g., as determined at the operation 514, one or more of the parameters may be modified to allow for continued functionality. In the example of FIG. 3, a time gap or a distance may be increased or a maximum speed of the vehicle may be decreased, e.g., to provide a greater margin of safety. Of course, these are only examples and other task parameters, and the way in which those parameters can be modified, will be appreciated with the benefit of this disclosure.

At an operation 518, in response to determining the modified task parameters, the process 500 includes controlling the vehicle according to a modified functionality. For example, when the probabilistic model indicates that the vehicle may be unequipped to perform the task(s) nominally, modified control commands may be generated according to restrictions to normal functionality. Without limitation, a speed of the vehicle may be restricted, an acceleration of the vehicle may be restricted, certain actions may be prohibited, or the like.

As will be appreciated from this foregoing, this application facilitates completion of tasks at an autonomous vehicle at different levels of functionality. These levels of functionality may be dynamically determined, e.g., in real-time as the vehicle travels through an environment, based on quantified metrics associated with vehicle capabilities. For instance, the metrics are determined using a system-wide model of the autonomous vehicle.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: An autonomous vehicle comprising: a first sensor configured to output first sensor data and associated with a first uncertainty; a second sensor configured to output second sensor data and associated with a second uncertainty; a computing subsystem configured to generate subsystem data based at least in part on the first sensor data and the second sensor data; a vehicle controller; one or more processors; and memory storing one or more computer-readable media storing instructions executable by the one or more processors to perform operations comprising: receiving, at the computing subsystem, the first sensor data, the first uncertainty, the second sensor data, and the second uncertainty; determining, based at least in part on the first data and the second data, the subsystem data; determining, based at least in part on a model and using the first uncertainty and the second uncertainty, a third uncertainty associated with the subsystem data; determining, based at least in part on the third uncertainty, a vehicle capability metric; receiving a request to control the autonomous vehicle to perform a task, performance of the task being based, at least in part, on the subsystem data; receiving a range of vehicle capability metrics threshold associated with the component being able to safely perform the task; determining, as a comparison, whether the vehicle capability metric is within the range of vehicle capability metrics; and controlling the autonomous vehicle, via the vehicle controller, to perform the task based at least in part on the comparison.

B: The autonomous vehicle of example A, wherein the determining the third uncertainty is based at least in part on a probabilistic graphical model of the autonomous vehicle, the probabilistic graphical model comprising a first node associated with the first sensor, a second node associated with the second sensor, and a third node associated with the computing subsystem, the first node and the second node being connected to the third node.

C: The autonomous vehicle of example A or example B, wherein the probabilistic graphical model comprises a Bayesian network.

D: The autonomous vehicle of any one of example A through example C, wherein the range of vehicle capability metrics comprises a first range and a second range, the operations further comprising: generating a first instruction to control the autonomous vehicle according to nominal functionality in response to the comparison indicating that the vehicle capability metric is within the first range; and generating a second instruction to control the autonomous vehicle according to modified functionality in response to the comparison indicating that the vehicle capability metric is within the second range.

E: The autonomous vehicle of any one of example A through example D, wherein the generating the second instruction to control the autonomous vehicle comprises: determining one or more modified task parameters associated with performance of the task by the autonomous vehicle; and generating the second instruction to comport operation of the autonomous vehicle with the modified task parameters.

F: The autonomous vehicle of any one of example A through example E, the operations further comprising: receiving time information associated with at least one of the first sensor data, the second sensor data or the subsystem data, wherein the determining the vehicle capability metric is further based at least in part on the time information.

G: The autonomous vehicle of any one of example A through example F, wherein the task comprises at least one of: planning a trajectory; following a trajectory; travelling in a traffic lane; travelling relative to objects in an environment of the autonomous vehicle; changing a lane of travel; or travelling safely in an environment of the autonomous vehicle.

H: An example method includes: receiving, from a sensor associated with a vehicle, sensor data and an uncertainty associated with the sensor data; generating, based at least in part on the sensor data and at a computing subsystem of the vehicle, subsystem data; generating, based at least in part on the first uncertainty and an error associated with the computing subsystem, a second uncertainty associated with the subsystem data; determining, based at least in part on the second uncertainty, a vehicle capability metric associated with a task to be performed by the vehicle using the subsystem data; and performing the task based at least in part on the vehicle capability metric.

I: The method of example H, wherein the determining the second uncertainty is based at least in part on a probabilistic graphical model of the vehicle, the probabilistic graphical model comprising a first node associated with the sensor and a second node associated with the computing subsystem, wherein the first node is a leaf of the second node.

J: The method of example H or example I, wherein the probabilistic graphical model comprises a Bayesian network.

K: The method of any one of example H through example J, further comprising receiving time information associated with at least one of the first sensor data or the subsystem data, wherein the determining the vehicle capability metric is further based at least in part on the time information.

L: The method of any one of example H through example K, further comprising: comparing the vehicle capability metric to a range of vehicle capability metrics associated with the task; and generating, based at least in part on the comparison, one or more control commands for performing the task.

M: The method of any one of example H through example L, wherein the one or more control commands comprise a first control command for performing the task according to nominal functionality or a second control command for performing the task according to modified functionality.

N: The method of any one of example H through example M, wherein the one or more control commands comprise the second control command, the generating the second control command comprising: determining one or more modified task parameters associated with performance of the task; and generating the second control command to comport performance of the task with the modified task parameters.

O: The method of any one of example H through example N, wherein the modified task parameters comprise at least one of: a reduced maximum speed of the vehicle; a reduced maximum acceleration of the vehicle; an increased physical distance; or an increased time gap.

P: The method of any one of example H through example O, wherein the generating the subsystem data comprises at least one of: generating information about a state of the autonomous vehicle; generating information about an object in an environment of the autonomous vehicle; or generating a trajectory for the autonomous vehicle.

Q: The method of any one of example H through example P, further comprising: receiving additional information comprising at least one of memory usage associated with the autonomous vehicle or network usage associated with autonomous vehicle, wherein the vehicle capability metric is further based at least in part on the additional information.

R: An example non-transitory computer-readable medium storing instructions, the instructions being executable by one or more processors to perform acts comprising: receiving, from a sensor associated with a vehicle, sensor data and an uncertainty associated with the sensor data; generating, based at least in part on the sensor data and at a computing subsystem of the vehicle, subsystem data; generating, based at least in part on the first uncertainty and an error associated with the computing subsystem, a second uncertainty associated with the subsystem data; determining, based at least in part on the second uncertainty, a vehicle capability metric associated with a task to be performed by the autonomous vehicle using the subsystem data; and performing the task based at least in part on the vehicle capability metric.

S: The non-transitory computer-readable medium of example R, the acts further comprising comparing the vehicle capability metric to a range of vehicle capability metrics associated with the task; and generating, based at least in part on the comparison, one or more control commands for performing the task.

T: The non-transitory computer-readable medium of example R or example S, wherein the one or more control commands comprise a first control command for performing the task according to nominal functionality or a second control command for performing the task according to modified functionality.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. An autonomous vehicle comprising:
   a first sensor configured to output first sensor data and associated with a first uncertainty;
   a second sensor configured to output second sensor data and associated with a second uncertainty;
   a computing subsystem configured to generate subsystem data based at least in part on the first sensor data and the second sensor data;
   a vehicle controller;
   one or more processors; and
   memory storing one or more computer-readable media storing instructions executable by the one or more processors to perform operations comprising:
      receiving, at the computing subsystem, the first sensor data, the first uncertainty, the second sensor data, and the second uncertainty;
      determining, based at least in part on the first sensor data and the second sensor data, the subsystem data;
      determining, based at least in part on a model and using the first uncertainty and the second uncertainty, a third uncertainty associated with the subsystem data;
      determining, based at least in part on the third uncertainty, a vehicle capability metric;
      receiving a request to control the autonomous vehicle to perform a task, performance of the task being based, at least in part, on the subsystem data;
      receiving a range of vehicle capability metrics associated with the autonomous vehicle being able to safely perform the task;
      determining, as a comparison, whether the vehicle capability metric is within the range of vehicle capability metrics; and
      controlling the autonomous vehicle, via the vehicle controller, to perform the task based at least in part on the comparison.

2. The autonomous vehicle of claim 1, wherein the determining the third uncertainty is based at least in part on a probabilistic graphical model of the autonomous vehicle, the probabilistic graphical model comprising a first node associated with the first sensor, a second node associated with the second sensor, and a third node associated with the computing subsystem, the first node and the second node being connected to the third node.

3. The autonomous vehicle of claim 2, wherein the probabilistic graphical model comprises a Bayesian network.

4. The autonomous vehicle of claim 1, wherein the range of vehicle capability metrics comprises a first range and a second range, the operations further comprising:
generating a first instruction to control the autonomous vehicle according to nominal functionality in response to the comparison indicating that the vehicle capability metric is within the first range; and
generating a second instruction to control the autonomous vehicle according to modified functionality in response to the comparison indicating that the vehicle capability metric is within the second range.

5. The autonomous vehicle of claim 4, wherein the generating the second instruction to control the autonomous vehicle comprises:
determining one or more modified task parameters associated with performance of the task by the autonomous vehicle; and
generating the second instruction to comport operation of the autonomous vehicle with the modified task parameters.

6. The autonomous vehicle of claim 1, the operations further comprising:
receiving time information associated with at least one of the first sensor data, the second sensor data or the subsystem data,
wherein the determining the vehicle capability metric is further based at least in part on the time information.

7. The autonomous vehicle of claim 1, wherein the task comprises at least one of:
planning a trajectory;
following a trajectory;
travelling in a traffic lane;
travelling relative to objects in an environment of the autonomous vehicle;
changing a lane of travel; or
travelling safely in an environment of the autonomous vehicle.

8. A method comprising:
receiving, from a sensor associated with a vehicle, sensor data and a first uncertainty associated with the sensor data;
generating, based at least in part on the sensor data and at a computing subsystem of the vehicle, subsystem data;
generating, based at least in part on the first uncertainty and an error associated with the computing subsystem, a second uncertainty associated with the subsystem data;
determining, based at least in part on the second uncertainty, a vehicle capability metric associated with a task to be performed by the vehicle using the subsystem data; and
controlling the vehicle to perform the task based at least in part on the vehicle capability metric.

9. The method of claim 8, wherein the determining the second uncertainty is based at least in part on a probabilistic graphical model of the vehicle, the probabilistic graphical model comprising a first node associated with the sensor and a second node associated with the computing subsystem, wherein the first node is a leaf of the second node.

10. The method of claim 9, wherein the probabilistic graphical model comprises a Bayesian network.

11. The method of claim 8, further comprising receiving time information associated with at least one of the sensor data or the subsystem data,
wherein the determining the vehicle capability metric is further based at least in part on the time information.

12. The method of claim 8, further comprising:
comparing the vehicle capability metric to a range of vehicle capability metrics associated with the task; and
generating, based at least in part on the comparison, one or more control commands for performing the task.

13. The method of claim 12, wherein the one or more control commands comprise a first control command for performing the task according to nominal functionality or a second control command for performing the task according to modified functionality.

14. The method of claim 13, wherein the one or more control commands comprise the second control command, the generating the second control command comprising:
determining one or more modified task parameters associated with performance of the task; and
generating the second control command to comport performance of the task with the modified task parameters.

15. The method of claim 14, wherein the modified task parameters comprise at least one of:
a reduced maximum speed of the vehicle;
a reduced maximum acceleration of the vehicle;
an increased physical distance; or
an increased time gap.

16. The method of claim 8, wherein the generating the subsystem data comprises at least one of:
generating information about a state of the vehicle;
generating information about an object in an environment of the vehicle; or
generating a trajectory for the vehicle.

17. The method of claim 8, further comprising:
receiving additional information comprising at least one of memory usage associated with the vehicle or network usage associated with vehicle,
wherein the vehicle capability metric is further based at least in part on the additional information.

18. A non-transitory computer-readable medium storing instructions, the instructions being executable by one or more processors to perform acts comprising:
receiving, from a sensor associated with a vehicle, sensor data and an uncertainty associated with the sensor data;
generating, based at least in part on the sensor data and at a computing subsystem of the vehicle, sub system data;
generating, based at least in part on the first uncertainty and an error associated with the computing subsystem, a second uncertainty associated with the subsystem data;
determining, based at least in part on the second uncertainty, a vehicle capability metric associated with a task to be performed by the vehicle using the subsystem data; and
controlling the vehicle to perform the task based at least in part on the vehicle capability metric.

19. The non-transitory computer-readable medium of claim 18, the acts further comprising:
comparing the vehicle capability metric to a range of vehicle capability metrics associated with the task; and generating, based at least in part on the comparing, one or more control commands for performing the task.

20. The non-transitory computer-readable medium of claim 19, wherein the one or more control commands comprise a first control command for performing the task according to nominal functionality or a second control command for performing the task according to modified functionality.

\* \* \* \* \*